US012142414B2

(12) United States Patent
Takezawa et al.

(10) Patent No.: US 12,142,414 B2
(45) Date of Patent: Nov. 12, 2024

(54) COIL COMPONENT

(71) Applicant: Murata Manufacturing Co., Ltd., Kyoto-fu (JP)

(72) Inventors: Kaori Takezawa, Nagaokakyo (JP); Shigeto Yamamoto, Nagaokakyo (JP); Shingo Nakamoto, Nagaokakyo (JP); Yukinobu Masuda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 526 days.

(21) Appl. No.: 17/675,724

(22) Filed: Feb. 18, 2022

(65) Prior Publication Data

US 2022/0285086 A1 Sep. 8, 2022

(30) Foreign Application Priority Data

Mar. 3, 2021 (JP) ................................ 2021-033448

(51) Int. Cl.
*H01F 27/29* (2006.01)
*H01F 27/24* (2006.01)
*H01F 27/28* (2006.01)

(52) U.S. Cl.
CPC ............ *H01F 27/29* (2013.01); *H01F 27/24* (2013.01); *H01F 27/2823* (2013.01)

(58) Field of Classification Search
CPC ....... H01F 27/29; H01F 27/24; H01F 27/2823
See application file for complete search history.

(56) References Cited

U.S. PATENT DOCUMENTS

2014/0097928 A1* 4/2014 Tomonari .............. H01F 17/045 336/207
2014/0167903 A1* 6/2014 Tomonari .............. H01F 17/045 336/220
2015/0371766 A1* 12/2015 Kawasaki ............ H01F 17/045 336/212
2017/0288626 A1* 10/2017 Kobayashi ........... H01F 41/069
2018/0096782 A1* 4/2018 Miyamoto ............. H01F 27/24
2019/0228895 A1* 7/2019 Asai ........................ H01F 17/04
2020/0105464 A1* 4/2020 Kobayashi ............. H01F 27/24
2021/0391108 A1* 12/2021 Kunitsuka ............ H01F 27/306
2021/0391109 A1* 12/2021 Kunitsuka ............ H01F 17/045

FOREIGN PATENT DOCUMENTS

JP 2014120730 A * 6/2014 ............ H01F 17/04
JP 2020-057637 A 4/2020
JP 2020-126976 A 8/2022
WO WO-2020098241 A1 * 5/2020 ............ H01F 27/28

* cited by examiner

*Primary Examiner* — Malcolm Barnes
(74) *Attorney, Agent, or Firm* — Studebaker & Brackett PC

(57) ABSTRACT

In a coil component, a first wire has a part that extends in a spiral shape along a peripheral surface of a winding core part with a central axis being the axis of rotation. A second wire has a part that extends in a spiral shape outside the peripheral surface of the winding core in a radial direction centered on the central axis with the central axis being the axis of rotation. The second wire includes an outer part and an inner part. The inner part extends continuously along the peripheral surface of the winding core part in a spiral shape through a range greater than 360 degrees. The outer part extends in a spiral shape outside the inner part in a radial direction centered on the central axis. The inner part is located between the L-th turn and the (L+1)-th turn of the first wire.

20 Claims, 6 Drawing Sheets

COIL COMPONENT

CROSS-REFERENCE TO RELATED APPLICATION

This application claims benefit of priority to Japanese Patent Application No. 2021-033448, filed Mar. 3, 2021, the entire content of which is incorporated herein by reference.

BACKGROUND

Technical Field

The present disclosure relates to a coil component.

Background Art

A coil component disclosed in Japanese Unexamined Patent Application Publication No. 2020-126976 includes a winding core part having a central axis and a first flange part and a second flange part. The winding core part has a quadrangular columnar shape. The first flange part is connected to a first end of the winding core part. The second flange part is connected to a second end of the winding core part that is on the opposite side from the first flange part.

In addition, the coil component disclosed in Japanese Unexamined Patent Application Publication No. 2020-126976 has four terminal electrodes. A first terminal electrode and a second terminal electrode are located on a surface of the first flange part. A third terminal electrode and a fourth terminal electrode are located on a surface of the second flange part.

In addition, the coil component disclosed in Japanese Unexamined Patent Application Publication No. 2020-126976 includes a first wire and a second wire. A first end of the first wire is connected to the first terminal electrode. A second end of the first wire, which is on the opposite side of the first wire from the first end, is connected to the third terminal electrode. A first end of the second wire is connected to the second terminal electrode. A second end of the second wire, which is on the opposite side of the second wire from the first end, is connected to the fourth terminal electrode. The first wire and the second wire extend in a spiral shape outside the winding core in a radial direction centered on the central axis with the central axis of the winding core as the axis of rotation. In addition, most of the second wire is located outside the first wire in the radial direction.

In the coil component disclosed in Japanese Unexamined Patent Application Publication No. 2020-126976, the second wire is located outside the first wire in the radial direction centered on the central axis. In other words, the second wire is farther from the winding core part than the first wire is. Therefore, it is highly likely that leakage magnetic flux of the second wire will be greater than leakage magnetic flux of the first wire. When the leakage magnetic flux of the second wire is large, the inductance value obtained by the second wire is smaller than the inductance value obtained by the first wire. As a result, the difference between the inductance value obtained by the first wire and the inductance value obtained by the second wire is increased. When the difference between the inductance values obtained by the first wire and the second wire is large, it is possible that the characteristics of the coil component will be adversely affected.

SUMMARY

Accordingly, the present disclosure provides a coil component that includes a winding core part having a central axis; a first flange part connected to a first end, in a direction along the central axis, of the winding core part; and a second flange part connected to a second end, which is on an opposite side from the first end, of the winding core part. The coil component also includes a first terminal electrode and a second terminal electrode located on a surface of the first flange part; a third terminal electrode and a fourth terminal electrode located on a surface of the second flange part; and a first wire including a part that extends in a spiral shape along a peripheral surface of the winding core part with the central axis serving as an axis of rotation. The first wire has a first end that is connected to the first terminal electrode and a second end, which is on an opposite side from the first end, that is connected to the third terminal electrode. The coil component further includes a second wire including a part that extends in a spiral shape outside the peripheral surface of the winding core part in a radial direction centered on the central axis with the central axis serving as an axis of rotation. The second wire has a first end that is connected to the second terminal electrode and a second end, which is on an opposite side from the first end, that is connected to the fourth terminal electrode. The second wire includes an inner part that extends continuously in a spiral shape through a range greater than 360 degrees along the peripheral surface of the winding core part and an outer part that extends in a spiral shape outside the inner part in the radial direction. When, out of the part of the first wire that is wound around the winding core part, a first turn closest to the first end of the first wire on a wire path of the first wire is referred to as a first turn and a final turn closest to the second end of the first wire on the wire path of the first wire is referred to as an M-th turn, and L is an integer from 1 to M−1, the inner part is located between an L-th turn and an (L+1)-th turn of the first wire.

According to the above configuration, the second wire has an inner part. The inner part is closer to the winding core part than the outer part is. Therefore, leakage magnetic flux of the inner part is smaller than leakage magnetic flux of the outer part. Thus, a reduction in the inductance value obtained by the second wire can be suppressed. As a result, the inductance value obtained by the second wire can be made larger than the inductance value would be if the second wire consisted of only the outer part.

In addition, the inner part is located between the L-th turn and the (L+1)-th turn of the first wire. Therefore, the L-th turn and the (L+1)-th turn of the first wire, which have the inner part interposed therebetween, are separated by a distance equivalent to the size of the inner part. Thus, the inductance value obtained by the first wire is smaller due to the leakage magnetic flux of the first wire being larger.

Thus, the difference between the inductance value obtained by the first wire and the inductance value obtained by the second wire can be reduced by making the inductance value obtained by the first wire smaller and the inductance value obtained by the second wire larger.

According to the aspect of the present disclosure, it is possible to suppress an increase in the difference between an inductance value obtained by a first wire and an inductance value obtained by a second wire.

DETAILED DESCRIPTION

Coil Component of Embodiment

Figure 1:
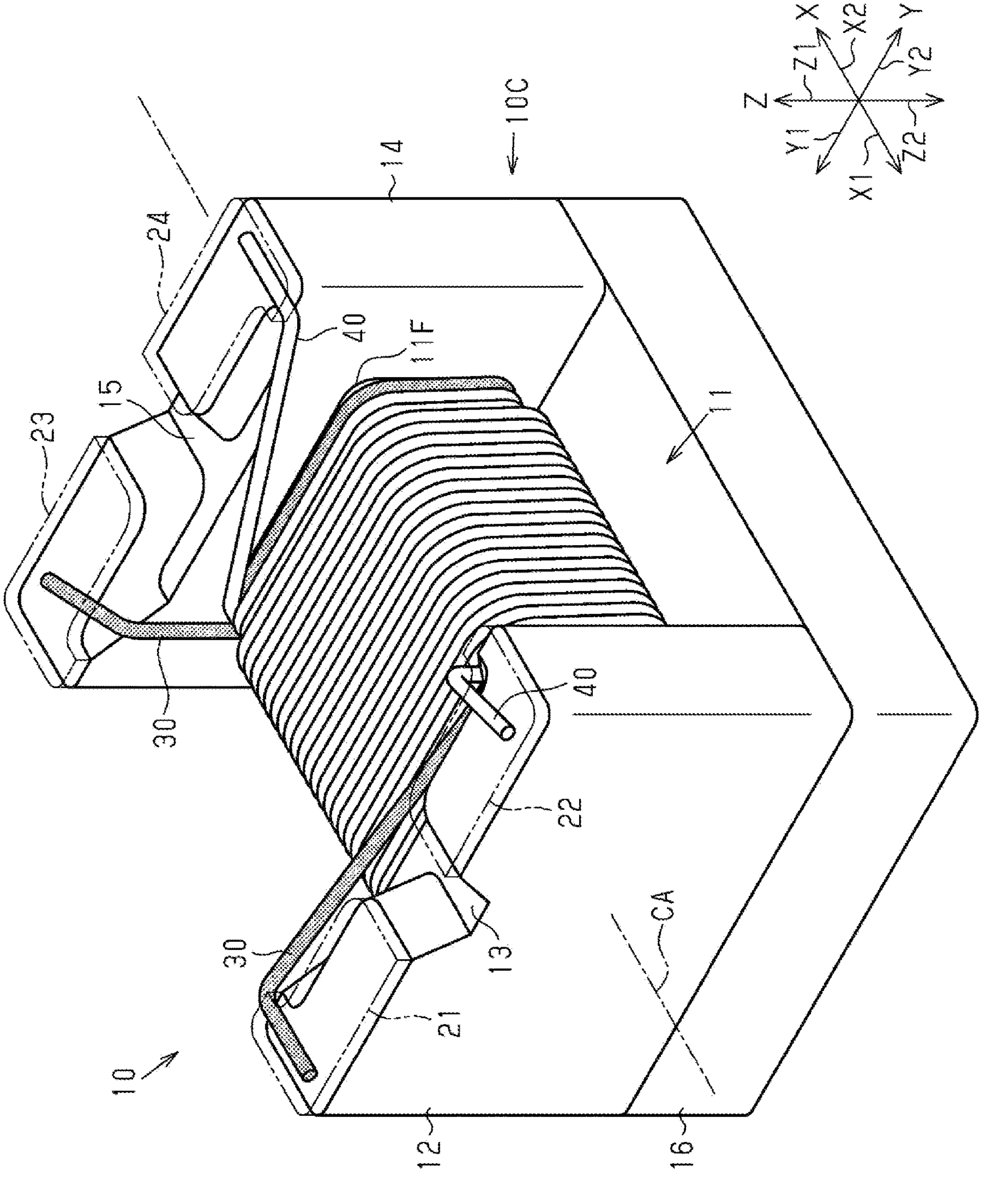
FIG. 1 is a perspective view of a coil component.

Hereafter, a coil component according to an embodiment will be described. In the drawings, constituent elements may be illustrated in an enlarged manner for ease of understanding. The dimensional ratios of the constituent elements may differ from the actual ratios or may differ from the ratios in other drawings. Furthermore, hatching is used in the sectional views, but the hatching of some constituent elements may be omitted for ease of understanding.

Overall Configuration

As illustrated in FIG. 1, a coil component 10 includes a winding core part 11. The winding core part 11 has a quadrangular columnar shape. Therefore, the winding core part 11 has a central axis CA and extends in a direction along the central axis CA. In addition, the winding core part 11 has a peripheral surface 11F that surrounds the central axis CA.

Note that, in the following description, an axis that extends in a direction along the central axis CA is referred to as a first axis X. In addition, an axis perpendicular to the first axis X is referred to as a second axis Y and an axis perpendicular to the first axis X and the second axis Y is referred to as a third axis Z. In a cross section of the winding core part 11 perpendicular to the central axis CA, an axis that extends parallel to any particular side among the four sides making up the quadrangular shape is referred to as the second axis Y and an axis in a direction perpendicular to both the central axis CA and the second axis Y is referred to as the third axis Z. One direction along the first axis X is referred to as a first positive direction X1 and the other direction extending along the first axis X is referred to as a first negative direction X2. In addition, one direction along the second axis Y is referred to as a second positive direction Y1 and the other direction extending along the second axis Y is referred to as a second negative direction Y2. Furthermore, one direction along the third axis Z is referred to as a third positive direction Z1 and the other direction extending along the third axis Z is referred to as a third negative direction Z2.

The coil component 10 includes a first flange part 12 and a second flange part 14. The first flange part 12 is connected to a first end of the winding core part 11, the first end being the end on the first positive direction X1 side. The first flange part 12 protrudes outwardly from the peripheral surface 11F of the winding core part 11 in a radial direction centered on the central axis CA.

A recessed portion 13 is recessed on an end surface of the first flange part 12 that is on the third positive direction Z1 side. The recessed portion 13 is located in a center part of the first flange part 12 in a direction along the second axis Y. The recessed portion 13 is recessed across the entire area of the first flange part 12 in a direction along the first axis X. Therefore, the end portions of the first flange part 12, in a direction along the second axis Y, are shaped as though the first flange part 12 has been partially split into two pieces with the recessed portion 13 interposed therebetween.

The second flange part 14 is connected to a second end of the winding core part 11, the second end being the end on the first negative direction X2 side. The second flange part 14 is shaped so as to be symmetrical with the first flange part 12 in a direction along the first axis X with the winding core part 11 interposed therebetween. In other words, a recessed portion 15 that is shaped so as to be symmetrical with the recessed portion 13 of the first flange part 12 is formed in an end surface of the second flange part 14 that is on the third positive direction Z1 side.

The winding core part 11, the first flange part 12, and the second flange part 14 form a core 10C of the coil component 10. The material constituting the core 10C is a non-conductive material. The material of the core 10C is, for example, alumina, a nickel-zinc ferrite, a resin, or a mixture of these materials.

The coil component 10 has a top plate 16. The top plate 16 is connected to ends of the core 10C that are on the third negative direction Z2 side. The top plate 16 has a rectangular plate-like shape. The top plate 16 is attached to the core 10C so as to span between the end surface of the first flange part 12 on the third negative direction Z2 side and the end surface of the second flange part 14 on the third negative direction Z2 side. The top plate 16 is composed of the same material as the core 10C and forms a closed magnetic path together with the core 10C.

The coil component 10 includes a first terminal electrode 21, a second terminal electrode 22, a third terminal electrode 23, and a fourth terminal electrode 24. The first terminal electrode 21 is located on a surface of the first flange part 12. Specifically, the first terminal electrode 21 is located on the end surface of the first flange part 12 on the third positive direction Z1 side in a region located further toward the second positive direction Y1 side than the recessed portion 13.

The second terminal electrode 22 is located on a surface of the first flange part 12. Specifically, the second terminal electrode 22 is located on the end surface of the first flange part 12 on the third positive direction Z1 side in a region located further toward the second negative direction Y2 side than the recessed portion 13.

The third terminal electrode 23 is located on a surface of the second flange part 14. Specifically, the third terminal electrode 23 is located on the end surface of the second flange part 14 on the third positive direction Z1 side in a region located further toward the second positive direction Y1 side than the recessed portion 15.

The fourth terminal electrode 24 is located on a surface of the second flange part 14. Specifically, the fourth terminal electrode 24 is located on the end surface of the second flange part 14 on the third positive direction Z1 side in a region located further toward the second negative direction Y2 side than the recessed portion 15. Note that, in the drawing, the first terminal electrode 21, the second terminal electrode 22, the third terminal electrode 23, and the fourth terminal electrode 24 are illustrated using two-dot chain lines.

The first to fourth terminal electrodes 21 to 24 each consist metal layer composed of silver and a plating layer composed of copper, nickel, or tin applied to the surface of the metal layer. In this embodiment, the surface of the coil component 10 on which the first to fourth terminal electrodes 21 to 24 are provided is the surface that faces a substrate when the coil component 10 is mounted on a substrate.

First Wire and Second Wire

Figure 3:
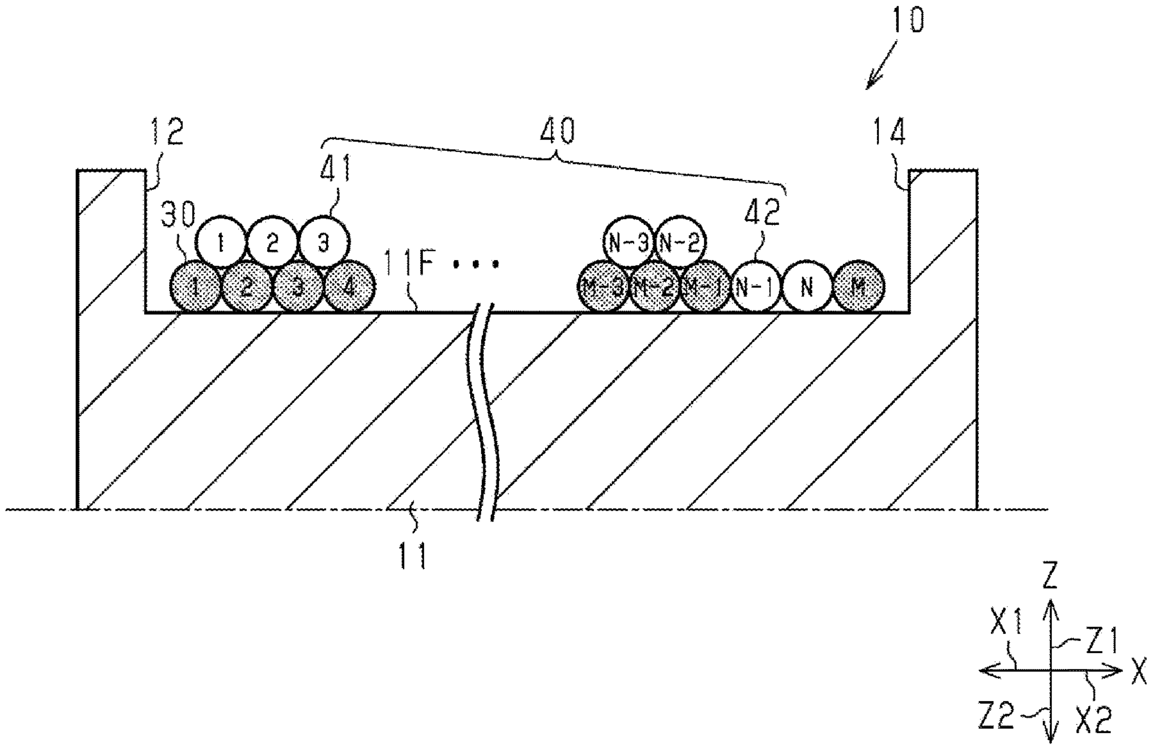
FIG. 3 is a partial sectional view of the coil component taken along line 3-3 in FIG. 2.

The coil component 10 includes a first wire 30 and a second wire 40. Part of the first wire 30 extends in a spiral shape around the peripheral surface 11F of the winding core part 11 with the central axis CA as the axis of rotation. As illustrated in FIG. 3, the first wire 30 has a circular shape in a cross section perpendicular to the direction in which the first wire 30 extends. The first wire 30 consists of a copper wire having a diameter of around 30 μm coated with an insulating film that is around 10 μm thick. In other words, the diameter of the first wire 30 is around 50 μm in a cross section perpendicular to the direction in which the first wire 30 extends.

Figure 2:
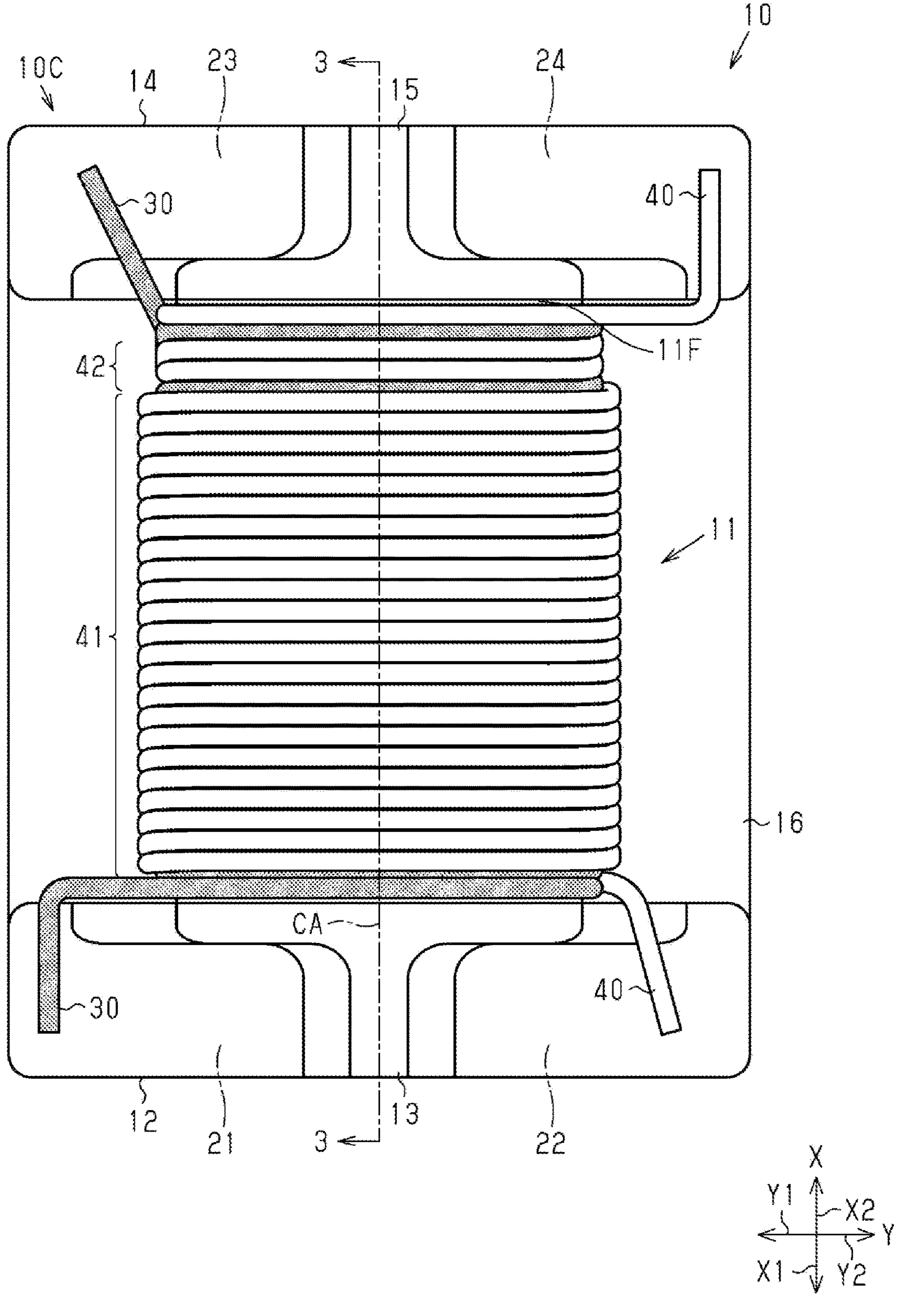
FIG. 2 is a plan view of the coil component.

As illustrated in FIG. 2, a first end of the first wire 30 is connected to the first terminal electrode 21. A part of the first wire 30 including the first end of the first wire 30 extends from the first terminal electrode 21 to the ridge line that is closest to the second terminal electrode 22 among the four ridge lines of the winding core part 11.

The first wire 30 is wound around the winding core part 11 in the clockwise direction when looking at the first wire 30 in the first negative direction X2. A part of the first wire 30 including the second end of the first wire 30 on the opposite side from the first end in the extension direction of the first wire 30 extends from the ridge line that is furthest from the fourth terminal electrode 24, among the four ridge lines of the winding core part 11, to the third terminal electrode 23 in the vicinity of the second flange part 14 of the winding core part 11. The second end of the first wire 30 is connected to the third terminal electrode 23.

As illustrated in FIG. 1, part of the second wire 40 extends in a spiral shape outside the peripheral surface 11F of the winding core part 11 in a radial direction centered on the central axis CA with the central axis CA being the axis of rotation. The second wire 40 has the same cross-sectional shape and dimensions as the first wire 30.

As illustrated in FIG. 2, a first end of the second wire 40 is connected to the second terminal electrode 22. A part of the second wire 40 including the first end of the second wire 40 extends to the ridge line that is farthest from the first terminal electrode 21 among the four ridge lines of the winding core part 11.

The second wire 40 is wound around the winding core part 11 in the clockwise direction when looking at the second wire 40 in the first negative direction X2. A part of the second wire 40 including the second end of the second wire 40 on the opposite side from the first end in the extension direction of the second wire 40 extends from the ridge line that is closest to the third terminal electrode 23, among the four ridge lines of the winding core part 11, to the fourth terminal electrode 24 in the vicinity of the second flange part 14 of the winding core part 11. The second end of the second wire 40 is connected to the fourth terminal electrode 24.

As illustrated in FIG. 3, the part of the first wire 30 that extends in a spiral shape around the peripheral surface 11F of the winding core part 11 is continuously wound through a range greater than 360 degrees with the central axis CA acting as the axis of rotation. When the first wire 30 is wound through 360 degrees with the central axis CA acting as the axis of rotation, the number of wound turns is “1”. Then, each time the angle through which the first wire 30 is wound is increased by 360 degrees, the number of wound turns is increased by 1.

In addition, out of the part of the first wire 30 extending in a spiral shape around the peripheral surface 11F of the winding core part 11, the range along the wire path of the first wire 30 from the end on the side connected to the first terminal electrode 21 up to a point where the first wire 30 has been wound through 360 degrees around the central axis CA is referred to as a first turn. Specifically, the range from the point at which the first wire 30 first contacts the winding core part 11, starting from the side near the first end of the first wire 30, to the point at which the first wire 30 has been wound through 360 degrees around the central axis CA along the peripheral surface 11F of the winding core part 11 is referred to as the first turn. The turn numbers of the first wire 30 wound around the winding core part 11 are a second turn, a third turn, and so on as the first wire 30 approaches the side near the third terminal electrode 23. The final turn that is closest to the end connected to the third terminal electrode 23 along the wire path of the first wire 30 is referred to as an M-th turn. In this embodiment, the final turn of the first wire 30 refers to the last turn that is wound through a complete revolution counting from the first turn in the process of winding the first wire 30 around the winding core part 11. In short, in this embodiment, the first wire 30 is wound around the winding core part 11 through a total of M and a half revolutions. If there is a winding point where the first wire 30 does not extend through a full turn after the M-th turn of the first wire 30, that turn number is omitted when expressing the turn numbers. In other words, the number of wound turns of the first wire 30 of this embodiment is M. In addition, in this embodiment, “along the wire path of the first wire 30” means along a path followed by the first wire 30. In FIG. 3, the first wire 30 is illustrated with an ellipse and turn numbers.

In addition, out of the part of the second wire 40 extending in a spiral shape outside the peripheral surface 11F of the winding core part 11 in the radial direction centered on the central axis CA, the range along the wire path of the second wire 40 from the end on the side connected to the second terminal electrode 22 up to a point where the second wire 40 has been wound through 360 degrees around the central axis CA is referred to as a first turn. The turn numbers of the second wire 40 wound around the winding core part 11 are a second turn, a third turn, and so on as the second wire 40 approaches the side near the fourth terminal electrode 24. The final turn that is closest to the end connected to the fourth terminal electrode 24 along the wire path of the second wire 40 is referred to as an N-th turn. In addition, in this embodiment, the final turn of the second wire 40 refers to the last turn that is wound through a complete revolution counting from the first turn in the process of winding the second wire 40 around the winding core part 11. In short, in this embodiment, the second wire 40 is wound around the winding core part 11 through a total of N and a half revolutions. The method used to count the number of wound turns of the second wire 40 is the same as that used for the first wire 30. In other words, the number of wound turns of the second wire 40 is N. In addition, in this embodiment, “along the wire path of the second wire 40” means along a path followed by the second wire 40. In FIG. 3, the second wire 40 is illustrated in white along with the turn numbers.

In this embodiment, the numbers of wound turns N of the second wire 40 is equal to the number of wound turns M of the first wire 30. In addition, in this embodiment, the numbers of wound turns N of the second wire 40 and the number of wound turns M of the first wire 30 are each 5 or more.

The first turn of the first wire 30 extends in a spiral shape along the peripheral surface 11F of the winding core part 11 near the first flange part 12. The second turn of the first wire 30 extends adjacent to the edge, which is on first negative direction X2 side, of the first turn of the first wire 30. Similarly, in the third to (M−1)-th turns of the first wire 30, the first wire 30 extends in a spiral shape along the peripheral surface 11F of the winding core part 11 so that a turn having larger turn number is located adjacent to the edge, in the first negative direction X2, of the turn of the first wire 30 wound one turn earlier.

The first turn of the second wire 40 extends at a point outside the boundary between the first turn and the second turn of the first wire 30, which are adjacent to each other in a direction along the first axis X, in the radial direction centered on the central axis CA. Here, "turns that are adjacent to each other in a direction along the first axis X" refers to any one particular turn and a turn that is one turn subsequent to that particular turn out of turns of the first wire 30 or turns of the second wire 40.

In addition, the first turn of the second wire 40 extends along a boundary extending between turns of the first wire 30 that are adjacent to each other in a direction along the first axis X so as to contact the outer surfaces of the first turn and the second turn of the first wire 30.

The second turn of the second wire 40 extends at a point outside the boundary extending between the second turn and the third turn of the first wire 30, which are adjacent to each other in a direction along the first axis X, in the radial direction centered on the central axis CA. In addition, the second turn of the second wire 40 extends so as to contact the outer surfaces of the second turn and the third turn of the first wire 30 along this boundary. The second turn of the second wire 40 extends adjacent to the edge, which is on first negative direction X2 side, of the first turn of the second wire 40. Similarly, in the third to (N−2)-th turns of the second wire 40, the second wire 40 extends in a spiral shape in contact with the outer surface of the first wire 30 so that a turn having a larger turn number is located adjacent to the edge, in the first negative direction X2, of the turn of the second wire 40 wound one turn earlier.

The (N−1)-th turn of the second wire 40 extends adjacent to the edge, which is on first negative direction X2 side, of the (M−1)-th turn of the first wire 30. Then, the N-th turn of the second wire 40 extends adjacent to the edge, which is on first negative direction X2 side, of the (N−1)-th turn of the second wire 40. In other words, the (N−1)-th turn and the N-th turn of the second wire 40 extend along the peripheral surface 11F of the winding core part 11. Therefore, the (N−1)-th turn and the N-th turn of the second wire 40 are located nearer the inside in the radial direction centered on the central axis CA than the first to (N−2)-th turns of the second wire 40.

In addition, the M-th turn of the first wire 30 extends adjacent to the edge, which is on first negative direction X2 side, of the N-th turn of the second wire 40. Therefore, the (N−1)-th turn and the N-th turn of the second wire 40 are interposed between the (M−1)-th turn and the M-th turn of the first wire 30.

Outer Part and Inner Part

The second wire 40 includes an outer part 41 and an inner part 42. In the above-described second wire 40, the outer part 41 consists of the part from the first turn to the (N−2)-th turn and the inner part 42 consists of the part from the (N−1)-th turn to the N-th turn. As described above, the outer part 41 consisting of the part from the first turn to the (N−2)-th turn of the second wire 40 extends in a spiral shape outside the inner part 42 consisting of the (N−1)-th turn and the N-th turn of the second wire 40 in the radial direction centered on the central axis CA.

Furthermore, the inner part 42 is formed by two revolutions consisting of the (N−1)-th turn and the N-th turn of the second wire 40. Therefore, the inner part 42 extends continuously along the peripheral surface 11F of the winding core part 11 in a spiral shape through a range of 720 degrees, which is greater than 360 degrees. In addition, in this embodiment, the number of wound turns N of the second wire 40 is 5 or more, and therefore the number of wound turns of the inner part 42 is "2" and the number of wound turns of the outer part 41 is "3" or more. Therefore, the number of wound turns of the outer part 41 is greater than the number of wound turns of the inner part 42.

The N-th turn of the second wire 40 extends adjacent to the edge, which is on first negative direction X2 side, of the (N−1)-th turn of the second wire 40. Therefore, in the inner part 42, turns of the second wire 40 that are adjacent to each other in a direction along the first axis X touch each other when looking at a cross section containing the central axis CA.

In addition, the (N−1)-th turn and the N-th turn of the second wire 40 are interposed between the (M−1)-th turn and the M-th turn of the first wire 30. Therefore, the inner part 42 is located between turns of the first wire 30 that are adjacent to each other in a direction along the first axis X. Therefore, the inner part 42 is located between an L-th turn and an (L+1)-th turn of the first wire 30, where L is an integer from 1 to M−1. In particular, in this embodiment, L is M−1 out of integers from 1 to M−1.

Comparative Tests

Figure 4:
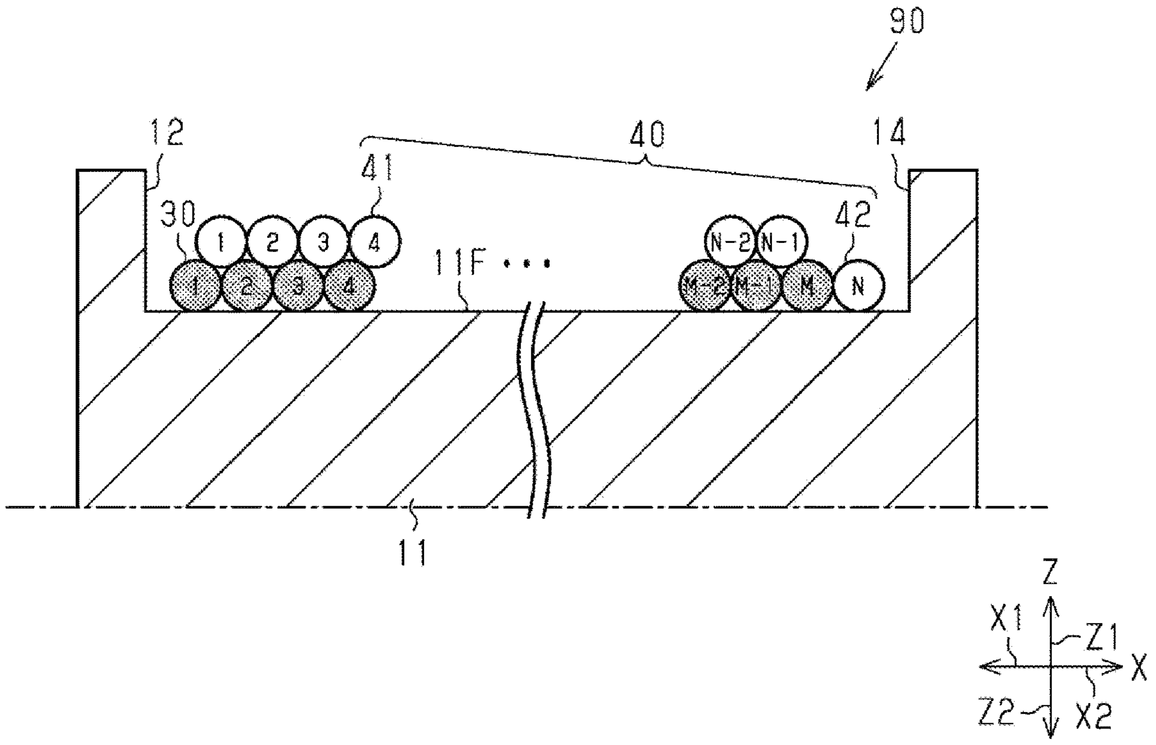
FIG. 4 is a partial sectional view of a coil component of a comparative example.

First, a coil component 90 of a comparative example will be described. As illustrated in FIG. 4, the coil component 90 of the comparative example differs from the coil component 10 of the above-described embodiment with respect to the M-th turn of the first wire 30 and the (N−1)-th turn and the N-th turn of the second wire 40. Specifically, in the coil component 90 of the comparative example, the M-th turn of the first wire 30 extends adjacent to the edge, which is on the first negative direction X2 side, of the (M−1)-th turn of the first wire 30. Therefore, the second wire 40 is not interposed between the (M−1)-th turn and the M-th turn of the first wire 30.

In the coil component 90 of the comparative example, the (N−1)-th turn of the second wire 40 extends adjacent to the edge, which is on the first negative direction X2 side, of the (N−2)-th turn of the second wire 40. In addition, the N-th turn of the second wire 40 extends adjacent to the edge, which is on first negative direction X2 side, of the M-th turn of the first wire 30. Therefore, out of the part of the second wire 40 extending in a spiral shape outside the peripheral surface 11F of the winding core part 11 in the radial direction centered on the central axis CA, the part from the first turn to the (N−1)-th turn forms the outer part 41. The N-th turn of the second wire 40 forms the inner part 42 located nearer the inside than the outer part 41 in the radial direction centered the central axis CA. However, in the inner part 42 of the coil component 90, adjacent turns of the second wire 40 do not touch each other and the inner part 42 of the coil component 90 is not interposed between adjacent turns of the first wire 30.

Figure 5:
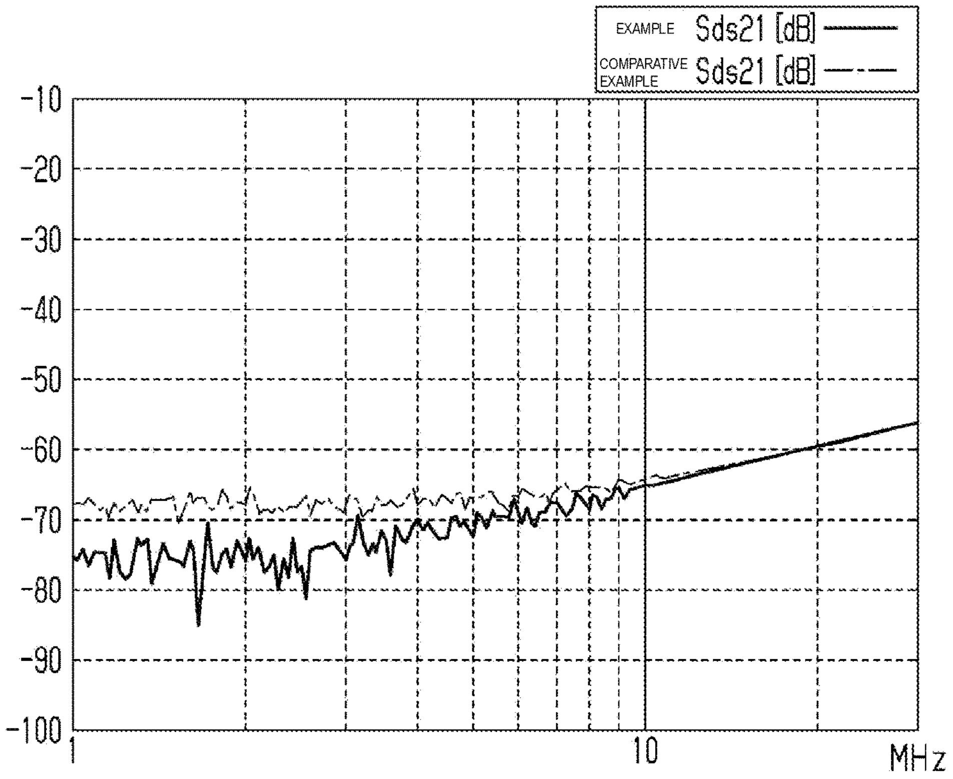
FIG. 5 is a graph illustrating mode conversion characteristics of a coil component of an example and a coil component of a comparative example.

As illustrated in FIG. 5, values of Sds21, which is one mode conversion characteristic, of the coil component 10 of the above-described embodiment and the coil component 90 of the comparative example were compared by performing experiments. In FIG. 5, the horizontal axis represents frequency and the vertical axis represents Sds21, which is one mode conversion characteristic. In FIG. 5, the solid line represents the characteristic of the coil component 10 of the above-described embodiment and the one-dot chain line represents the characteristic of the coil component 90 of the comparative example. Thus, in the coil component 10 of the embodiment, Sds21 is reduced in a frequency range of 10 MHz and lower compared to the coil component 90 of the comparative example.

Action of Embodiment

According to the coil component 10 of the above-described embodiment, the second wire 40 has the inner part 42. The inner part 42 extends continuously along the peripheral surface 11F of the winding core part 11 in a spiral shape through a range greater than 360 degrees, specifically, through a range of 720 degrees. Furthermore, the inner part 42 is nearer the central axis CA than the outer part 41 is. Therefore, leakage magnetic flux of the inner part 42 is smaller than leakage magnetic flux of the outer part 41.

In addition, the inner part 42 is located between the L-th turn and the (L+1)-th turn of the first wire 30. In particular, in this embodiment, the inner part 42 is located between the (M−1)-th turn and the M-th turn of the first wire 30. Therefore, the (M−1)-th turn and the M-th turn of the first wire 30, which have the inner part 42 interposed therebetween, are separated by a distance equivalent to the size of the inner part 42. Therefore, leakage magnetic flux of the first wire 30 is larger than the leakage magnetic flux would be if the (M−1)-th turn and the M-th turn contacted each other.

Effects of Embodiment (1) According to the coil component 10 of the above-described embodiment, the second wire 40 has the inner part 42. Therefore, as in the above-described action, leakage magnetic flux of the second wire 40 is smaller than the leakage magnetic flux would be if the second wire 40 did not have the inner part 42. On the other hand, leakage magnetic flux of the first wire 30 is larger than the leakage magnetic flux would be if the second wire 40 did not have the inner part 42.

Therefore, the inductance value obtained by the second wire 40 is increased due to the leakage magnetic flux of the second wire 40 being smaller than the leakage magnetic flux would be if the second wire 40 did not have the inner part 42. On the other hand, the inductance value obtained by the first wire 30 is smaller than the inductance value would be if the second wire 40 did not have the inner part 42.

Therefore, the inductance value obtained by the first wire 30 is decreased and the inductance value obtained by the second wire 40 is increased. Thus, the difference between the inductance value obtained by the first wire 30 and the inductance value obtained by the second wire 40 can be reduced. As a result, according to the coil component 10, Sds21, which is one mode conversion characteristic, can be reduced compared with a case where the second wire 40 does not have the inner part 42.

(2) According to the above-described embodiment, in the inner part 42, adjacent turns of the second wire 40 contact each other. In other words, the inner part 42 has a place where adjacent turns contact each other in a direction along the central axis CA. Therefore, the generation of leakage magnetic flux can be suppressed in a place where adjacent turns touch each other compared to a place where adjacent turns do not touch each other in the inner part 42. Therefore, according to the coil component 10 of the above-described embodiment, generation of leakage magnetic flux can be further suppressed in the place where adjacent turns of the wire 40 contact each other in the inner part 42.

(3) According to the coil component 10 of the above-described embodiment, the inner part 42 is located between the (M−1)-th turn and the M-th turn of the first wire 30. Therefore, in the process of manufacturing the coil component 10, it is sufficient that only the M-th turn, which is the final turn, be wound away from the (M−1)-th turn when winding the first wire 30 around the winding core part 11. Therefore, no significant changes need to be made to the manufacturing equipment or manufacturing process in order to dispose the inner part 42 between the (M−1)-th turn and the M-th turn of the first wire 30.

(4) If the inner part 42 does not include the final turn and the inner part 42 is located somewhere in the middle of the winding of the second wire 40, it is necessary to first wind the second wire 40 as the outer part 41, then as the inner part 42, and then again as the outer part 41. Therefore, when winding the second wire 40, it may be necessary to change the winding method a number of times during the winding process.

Regarding this point, according to the coil component 10 of the above-described embodiment, the inner part 42 consists of the (N−1)-th turn and the N-th turn of the second wire 40. In other words, the inner part 42 includes the N-th turn, which is the final turn. Therefore, when winding the second wire 40 around the winding core part 11, it is sufficient that only the part including the final turn be wound as the inner part 42. Therefore, according to the above-described embodiment, after winding the second wire 40 as the inner part 42 in this way, there is no need to change the winding method to wind the second wire 40 as the outer part 41.

(5) According to the coil component 10 of the above-described embodiment, the number of wound turns of the first wire 30 is the same as the number of wound turns of the second wire 40. In this case, the inductance values obtained by the wires cannot be adjusted using the numbers of wound turns. In this configuration, it is particularly desirable to provide the second wire 40 with the inner part 42 in order to reduce the difference between the inductance values of the wires.

(6) Symmetry between the coil formed of the first wire 30 and the coil formed of the second wire 40 is easily obtained when the number of wound turns of the first wire 30 and the number of wound turns of the second wire 40 are the same. In addition, it is easy to match the inductance values and the electrical resistance values of the first wire 30 and the second wire 40.

(7) According to the coil component 10 of the above-described embodiment, the number of wound turns of the outer part 41 of the second wire 40 is larger than the number of wound turns of the inner part 42 of the second wire 40. When the number of wound turns of the outer part 41 is reasonably large, the inductance value obtained by the outer part 41 of the second wire 40 is smaller than the inductance value that would be obtained by a first wire 30 having the same number of wound turns as the outer part 41. In this configuration, it is particularly desirable to provide the second wire 40 with the inner part 42 in order to reduce the difference between the inductance values of the wires.

Coil Components of Other Embodiments

The above-described embodiment can be modified in the following ways. The embodiments and the following modifications can be combined with each other to the extent that they are not technically inconsistent.

The shape of the winding core part 11 in the above-described embodiment is not limited to the example given in the above-described embodiment. For example, the shape may be a cylindrical shape or may be a polygonal columnar shape other than a quadrangular columnar shape.

In the above-described embodiment, the top plate 16 may be omitted.

In the above-described embodiment, it is sufficient that the core 10C include the winding core part 11, the first flange part 12 and the second flange part 14. For example, the recessed portion 13,15 may be omitted. In this case, for example, it is sufficient that the first terminal electrode 21 and the second terminal electrode 22 be spaced apart from each other and that the third terminal electrode 23 and that the fourth terminal electrode 24 be spaced apart from each other.

In the above-described embodiment, the materials and shapes of the first to fourth terminal electrodes 21 to 24 are not limited to the examples given in the above-described embodiment. For example, the material of the plating layers of the first to fourth terminal electrodes 21 to 24 may be tin, a nickel alloy, or the like. In addition, the first to fourth terminal electrodes 21 to 24 do not have to include plating layers and the electrically conductive metal layers thereof may be exposed.

In the above-described embodiment, the cross-sectional shapes and dimensions of the first wire 30 and the second wire 40 are not limited to the examples given in the above-described embodiment. For example, the diameters of the copper wires may be made larger and the thicknesses of the insulating films may be made larger than those described in the above-described embodiment.

The number of wound turns of the first wire 30 and the number of wound turns of the second wire 40 may be different from each other.

In the above-described embodiment, the range through which the inner part 42 extends is preferably a range in which the inner part 42 at least extends continuously through more than 360 degrees along the peripheral surface 11F of the winding core part 11. In other words, in the above-described embodiment, the number of wound turns of the inner part 42 is not limited to the example given in the above-described embodiment, but is preferably greater than "1". When the inner part 42 continuously extends through a range greater than 360 degrees, the inner part 42 has turns that are at least partially adjacent to each other.

In the above-described embodiment, in the inner part 42, turns that are adjacent to each other in a direction along the first axis X do not have to touch each other in a direction along the central axis CA.

In the above-described embodiment, the inner part 42 extends in a spiral shape while in constant contact with the peripheral surface 11F of the winding core part 11, but the inner part 42 may instead extend in a spiral shape with parts thereof separated from the peripheral surface 11F. For example, when the winding core part 11 is viewed in a direction along the central axis CA, the inner part 42 may contact the peripheral surface 11F in the vicinity of the four corners of the winding core part 11 and the inner part 42 may be separated from the peripheral surface 11F between those corners. Even when the inner part 42 intermittently contacts the peripheral surface 11F in this manner, the inner part 42 can be said to extend along the peripheral surface 11F.

Figure 6:
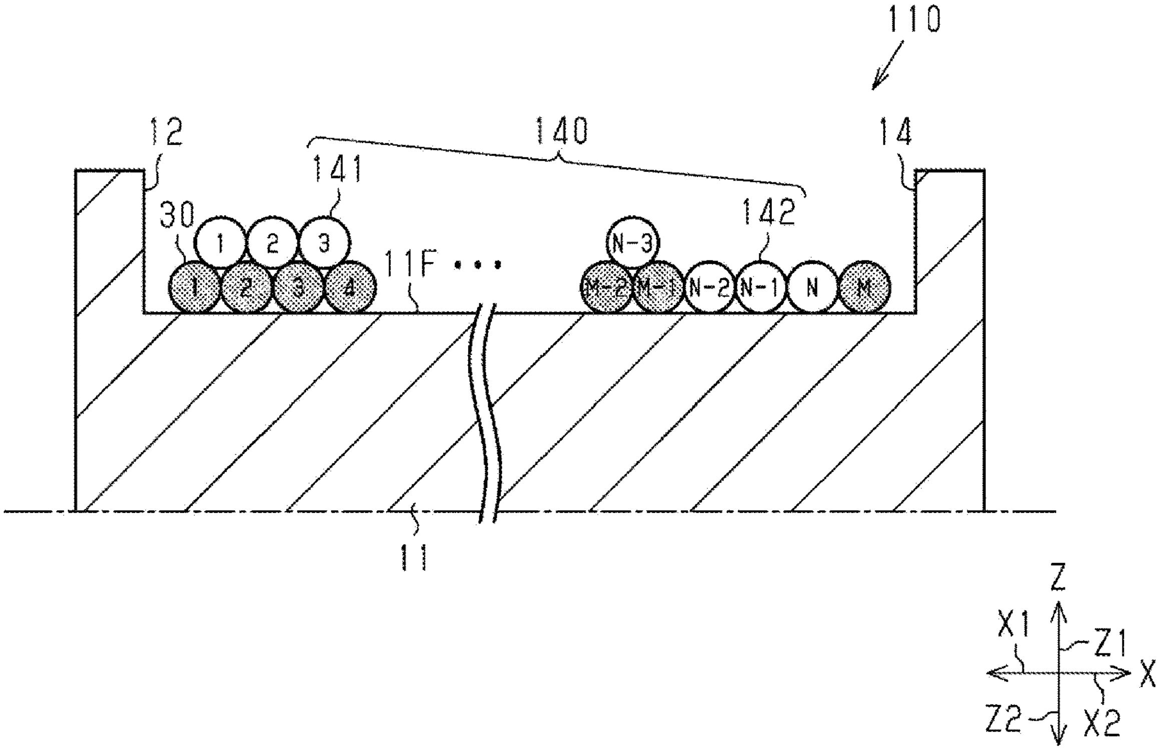
FIG. 6 is a partial sectional view of a coil component of a modification.

The number of wound turns of the inner part 42 may be greater than the example given in the above-described embodiment. In the example illustrated in FIG. 6, a second wire 140 of a coil component 110 includes an outer part 141 and an inner part 142. The outer part 141 is the part from the first turn to the (N−3)-th turn of the second wire 140. In the outer part 141, any one of the turns is separated from the adjacent turns in a direction in which the central axis CA extends. The inner part 142 is the part from the (N−2)-th turn to the N-th turn of the second wire 140. Therefore, the number of wound turns of the inner part 142 is 3. In other words, in this modification, the inner part 142 extends continuously along the peripheral surface 11F of the winding core part 11 through a range greater than 720 degrees. In this case, the inductance value obtained by the second wire 140 can be made even larger than in the coil component 10.

The number of wound turns of the inner part 42 may be greater than or equal to the number of wound turns of the outer part 41. The number of wound turns of the inner part 42 may be appropriately adjusted along with the number of wound turns of the first wire 30, the number of wound turns of the second wire 40, or the diameter of the winding core part 11 centered on the central axis CA.

In the above-described embodiment, the inner part 42 does not have to include the N-th turn of the second wire 40. Even in this case, the inductance value obtained by the second wire 40 can be increased by the inner part 42.

In the above-described embodiment, the inner part 42 may be located at a point that is not between the (M−1)-th turn and the M-th turn of the first wire 30. For example, the inner part 42 may be located between the (M−2)-th turn and the (M−1)-th turn of the first wire 30. In other words, the inner part 42 may be located between the L-th turn and the (L+1)-th turn of the first wire 30. In this case as well, the L-th turn and the (L+1)-th turn of the first wire 30 are separated from each other as a result of the inner part 42 being interposed between the L-th turn and the (L+1)-th turn of the first wire 30. Thus, the difference between the inductance values obtained by the two wires can be reduced by decreasing the inductance value obtained by the first wire 30 and increasing the inductance value obtained by the second wire 40.

In the above-described embodiment, in addition to the inner part 42, the second wire 40 may include another part located nearer the inside than the outer part 41. In the example illustrated in FIG. 7, a second wire 240 has an outer part 241, a first inner part 242, and a second inner part 243. The outer part 241 is the part from the second turn to the (N−2)-th turn of the second wire 240. The first inner part 242 consists of the (N−1)-th turn and the N-th turn of the second wire 240. The second inner part 243 consists of the first turn of the second wire 240. The first inner part 242 has the same configuration as the inner part 42 of the coil component 10 of the above-described embodiment. The second inner part 243 extends along the peripheral surface 11F of the winding core part 11 and is located between the first turn and the second turn of the first wire 30, which are adjacent turns of the first wire 30. In this case, a coil component 210 further includes the second inner part 243 in addition to the first inner part 242, and as a result, the inductance value obtained by the second wire 240 can be made larger than in the coil component 10.

Figure 7:
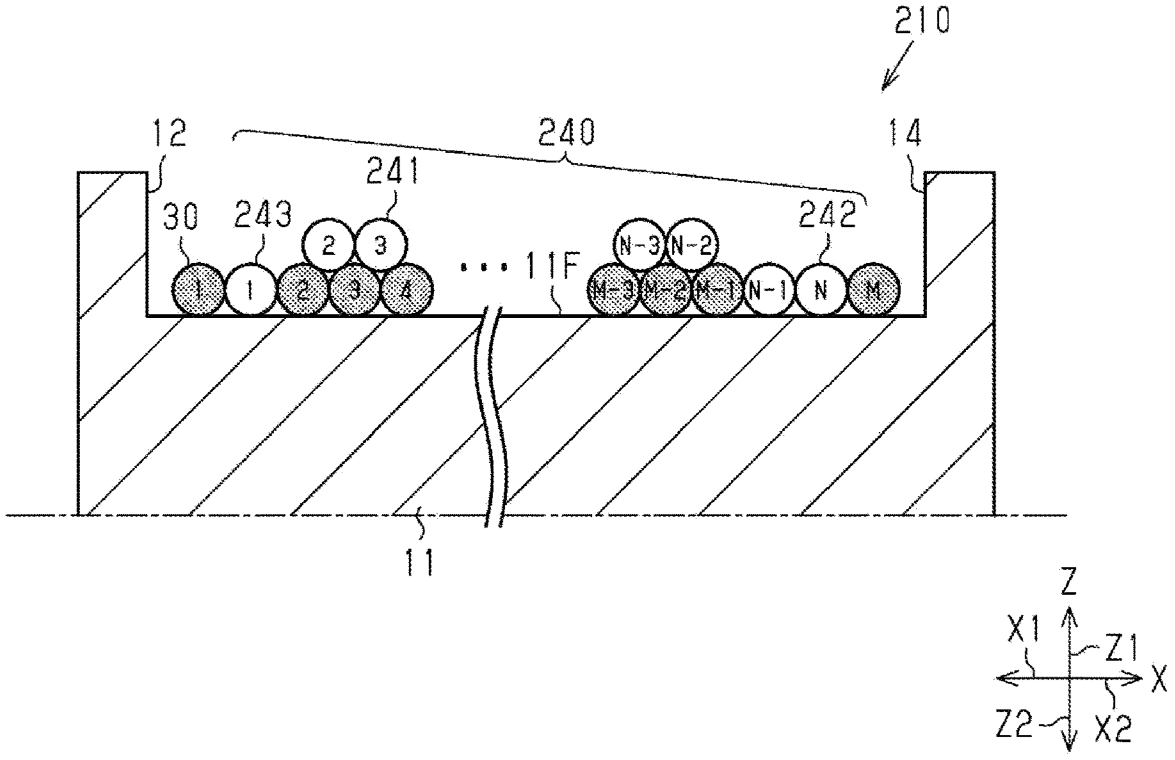
FIG. 7 is a partial sectional view of a coil component of a modification.

In addition, in the modification illustrated in FIG. 7, the second inner part 243 includes the first turn of the second wire 40. Therefore, it is sufficient that only the first turn be wound differently from the outer part 241 in order to provide the second inner part 243 in the process of manufacturing the coil component 210.

Furthermore, in the modification illustrated in FIG. 7, the second inner part 243 continuously extends through a range less than or equal to 360 degrees along the peripheral surface 11F of the winding core part 11. Therefore, the second inner part 243 is able to suppress the leakage magnetic flux by a smaller amount than the amount by which the leakage magnetic flux can be suppressed by the first inner part 242. Thus, it is easy to adjust the inductance value obtained by the second wire 40.

Figure 8:
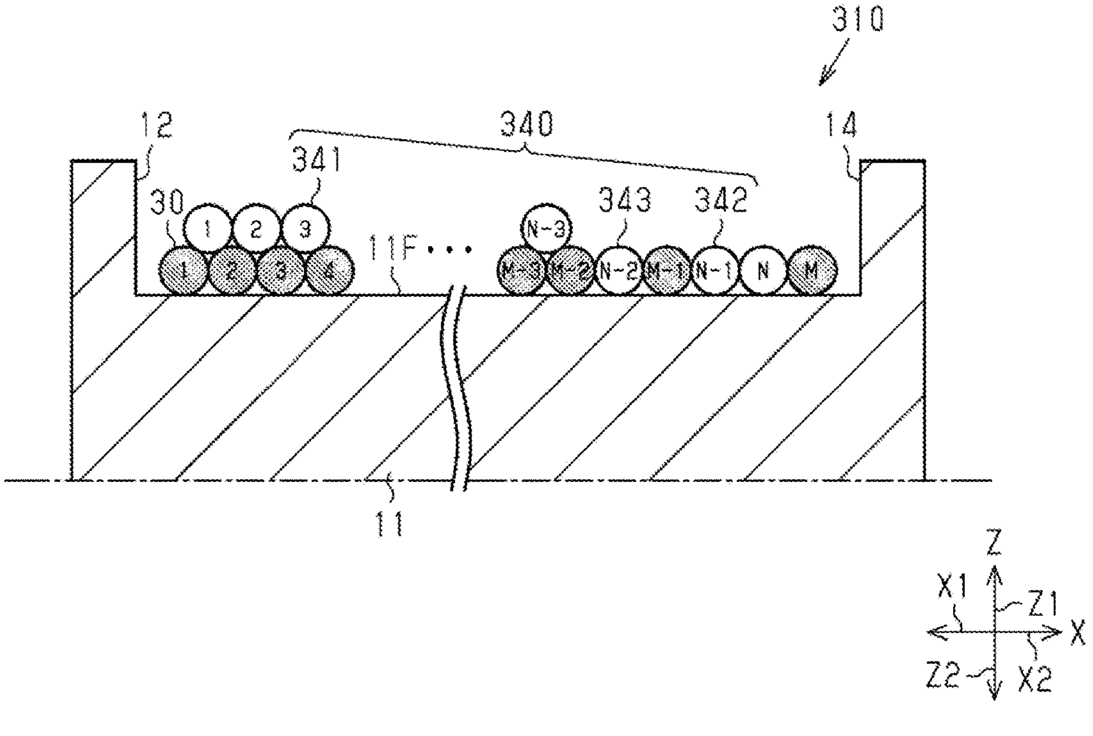
FIG. 8 is a partial sectional view of a coil component of a modification.

In the modification illustrated in illustrated FIG. 7, the second inner part 243 does not have to consist of the first turn of the second wire 40. In the example illustrated in FIG. 8, in a coil component 310, a second wire 340 has an outer part 341, a first inner part 342, and a second inner part 343. The outer part 341 is the part from the first turn to the (N−3)-th turn of the second wire 340. The first inner part 342 consists of the (N−1)-th turn and the N-th turn of the second wire 340. The second inner part 343 consists of the (N−2)-th turn. In this case as well, the (M−2)-th turn and the (M−1)-th turn of the first wire 30 are separated in a direction along the first axis X due to the presence of the second inner part 343. Thus, the difference between the inductance values can be adjusted by reducing the inductance value obtained by the first wire 30 by increasing the leakage magnetic flux of the first wire 30.

Figure 9:
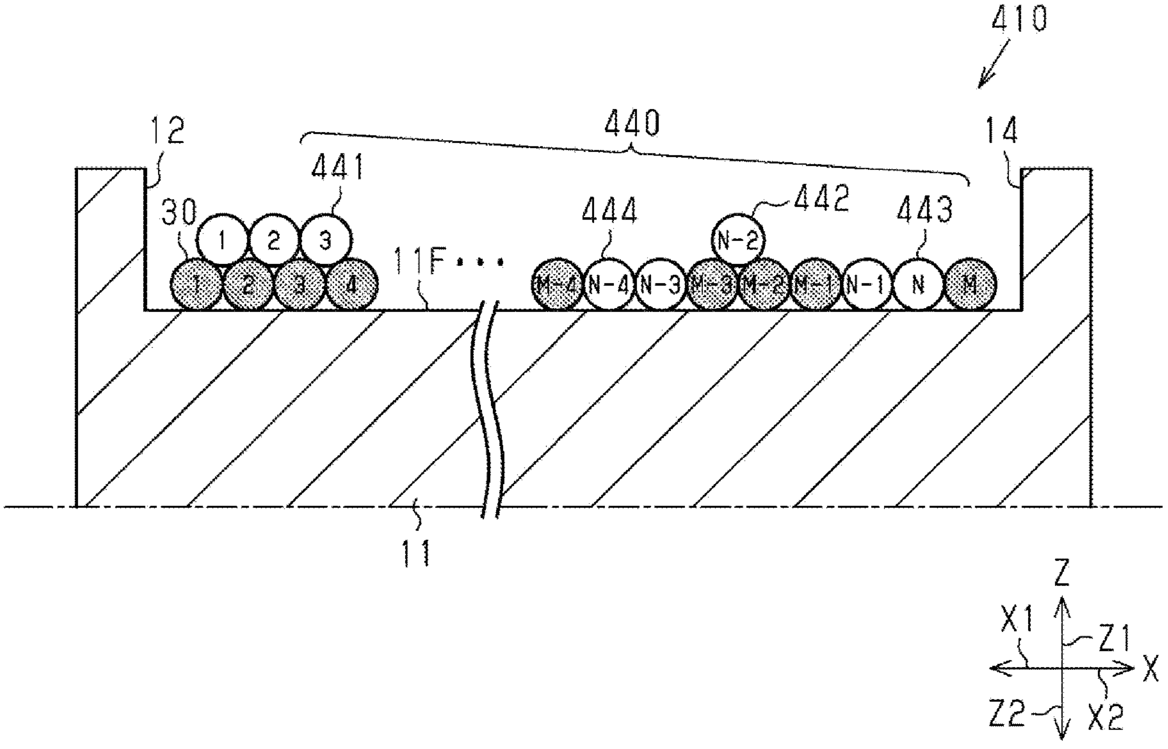
FIG. 9 is a partial sectional view of a coil component of a modification.

In the modification illustrated in FIG. 7, the second inner part 243 may continuously extend through a range greater than 360 degrees along the peripheral surface 11F of the winding core part 11. In the example illustrated in FIG. 9, in a coil component 410, a second wire 440 has a first outer part 441, a second outer part 442, a first inner part 443, and a second inner part 444. The outer part 441 is the part from the first turn to the (N−5)-th turn of the second wire 440. The second outer part 442 is the (N−2)-th turn of the second wire 440. The first inner part 443 consists of the (N−1)-th turn and the N-th turn of the second wire 440. The second inner part 444 consists of the (N−4)-th turn and the (N−3)-th turn of the second wire 440. Thus, the coil component 10 of the above-described embodiment may be provided with a plurality of inner parts 42. In the case of the modification illustrated in FIG. 9, the inductance value obtained by the second wire 440 can be made larger than in the case where there is no second inner part 444.

In the modification illustrated in FIG. 7, the second inner part 243 does not have to be positioned between the first turn and the second turn of the first wire 30. It is sufficient that the second inner part 243 be positioned between a K-th turn and a (K+1)-th turn of the first wire 30, where k is an integer from 1 to M−1. Since the second inner part 243 is provided separately from the first inner part 242, K is a different integer from L. For example, in the modification illustrated in FIG. 8, K is 1 and L is M−1. In addition, for example, in the modification illustrated in FIG. 9, K is M−4 and L is M−1.

In the above-described embodiment, the outer part 41 and the inner part 42 have been mainly described as being at places located on a surface of the peripheral surface 11F facing in the third positive direction Z1. It is sufficient that the positional relationship between the outer part 41 and the inner part 42 in a direction along the first axis X be satisfied in any cross section containing the central axis CA. Therefore, the same configuration does not have to be used for all the surfaces constituting the peripheral surface 11F. For example, on the surface facing in the third negative direction Z2 out of the peripheral surface 11F, the (M−1)-th turn of the first wire 30 may extend at a point outside the (N−1)-th turn of the second wire 40 in the radial direction centered on the central axis CA.

What is claimed is:

1. A coil component comprising:
a winding core part having a central axis;
a first flange part connected to a first end, in a direction along the central axis, of the winding core part;
a second flange part connected to a second end, which is on an opposite side from the first end, of the winding core part;
a first terminal electrode and a second terminal electrode located on a surface of the first flange part;
a third terminal electrode and a fourth terminal electrode located on a surface of the second flange part;
a first wire including a part that extends in a spiral shape along a peripheral surface of the winding core part with the central axis being an axis of rotation of the first wire, the first wire having a first end that is connected to the first terminal electrode and a second end, which is on an opposite side from the first end, that is connected to the third terminal electrode; and
a second wire including a part that extends in a spiral shape outside the peripheral surface of the winding core part in a radial direction centered on the central axis with the central axis being an axis of rotation of the second wire, the second wire having a first end that is connected to the second terminal electrode and a second end, which is on an opposite side from the first end, that is connected to the fourth terminal electrode,
wherein the second wire includes an inner part that extends continuously in a spiral shape through a range greater than 360 degrees along the peripheral surface of the winding core part and an outer part that extends in a spiral shape outside the inner part in the radial direction, and
when, out of the part of the first wire that is wound around the winding core part, a first turn closest to the first end of the first wire on a wire path of the first wire is referred to as a first turn and a final turn closest to the second end of the first wire on the wire path of the first wire is referred to as an M-th turn, and L is an integer from 1 to M−1,
the inner part is located between an L-th turn and an (L+1)-th turn of the first wire.

2. The coil component according to claim 1, wherein
in the inner part, in a cross section containing the central axis, adjacent turns of the second wire contact each other in a direction along the central axis.

3. The coil component according to claim 2, wherein
the inner part is located between the (M−1)-th turn and the M-th turn of the first wire.

4. The coil component according to claim 2, wherein
when, out of the part of the second wire that is wound around the winding core part, a first turn closest to the first end of the second wire on a wire path of the second wire is referred to as a first turn and a final turn closest to the second end of the second wire on the wire path of the second wire is referred to as an N-th turn,
the inner part includes the N-th turn.

5. The coil component according to claim 2, wherein
a number of wound turns of the first wire is the same as a number of wound turns of the second wire.

6. The coil component according to claim 2, wherein
a number of wound turns of the outer part is greater than a number of wound turns of the inner part.

7. The coil component according to claim 2, wherein
the inner part extends continuously through a range greater than 720 degrees along the peripheral surface of the winding core part.

8. The coil component according to claim 1, wherein the inner part is located between the (M−1)-th turn and the M-th turn of the first wire.

9. The coil component according to claim 8, wherein when, out of the part of the second wire that is wound around the winding core part, a first turn closest to the first end of the second wire on a wire path of the second wire is referred to as a first turn and a final turn closest to the second end of the second wire on the wire path of the second wire is referred to as an N-th turn, the inner part includes the N-th turn.

10. The coil component according to claim 8, wherein a number of wound turns of the first wire is the same as a number of wound turns of the second wire.

11. The coil component according to claim 8, wherein a number of wound turns of the outer part is greater than a number of wound turns of the inner part.

12. The coil component according to claim 8, wherein the inner part extends continuously through a range greater than 720 degrees along the peripheral surface of the winding core part.

13. The coil component according to claim 1, wherein when, out of the part of the second wire that is wound around the winding core part, a first turn closest to the first end of the second wire on a wire path of the second wire is referred to as a first turn and a final turn closest to the second end of the second wire on the wire path of the second wire is referred to as an N-th turn, the inner part includes the N-th turn.

14. The coil component according to claim 13, wherein a number of wound turns of the first wire is the same as a number of wound turns of the second wire.

15. The coil component according to claim 1, wherein a number of wound turns of the first wire is the same as a number of wound turns of the second wire.

16. The coil component according to claim 1, wherein a number of wound turns of the outer part is greater than a number of wound turns of the inner part.

17. The coil component according to claim 1, wherein the inner part extends continuously through a range greater than 720 degrees along the peripheral surface of the winding core part.

18. The coil component according to claim 1, wherein the inner part has a first inner part, and when K is an integer that is different from L that is from 1 to M−1, the second wire includes a second inner part that extends along the peripheral surface of the winding core part and is located between a K-th turn and a (K−1)-th turn of the first wire.

19. The coil component according to claim 18, wherein the second inner part extends along the peripheral surface of the winding core part through a range less than or equal to 360 degrees.

20. The coil component according to claim 18, wherein the second inner part extends continuously along the peripheral surface of the winding core part through a range greater than 360 degrees.

* * * * *